United States Patent
Jonker et al.

(10) Patent No.: US 10,071,354 B2
(45) Date of Patent: Sep. 11, 2018

(54) POLYCRYSTALLINE SUPERHARD MATERIAL AND METHOD FOR MAKING SAME

(71) Applicants: Element Six Abrasives S.A., Luxembourg (LU); Element Six Limited, County Clare (IE)

(72) Inventors: Cornelis Roelof Jonker, Springs (ZA); Roger William Nigel Nilen, Oxfordshire (GB); Maweja Kasonde, Oxfordshire (GB); Stig Åke Andersin, Robertsfors (SE)

(73) Assignees: ELEMENT SIX ABRASIVES S.A., Luxembourg (LU); ELEMENT SIX LIMITED (IE)

( * ) Notice: Subject to any disclaimer, the term of this patent is extended or adjusted under 35 U.S.C. 154(b) by 796 days.

(21) Appl. No.: 14/387,216

(22) PCT Filed: Mar. 27, 2013

(86) PCT No.: PCT/EP2013/056550
§ 371 (c)(1),
(2) Date: Sep. 22, 2014

(87) PCT Pub. No.: WO2013/144219
PCT Pub. Date: Oct. 3, 2013

(65) Prior Publication Data
US 2015/0041225 A1 Feb. 12, 2015

Related U.S. Application Data

(60) Provisional application No. 61/618,427, filed on Mar. 30, 2012.

(30) Foreign Application Priority Data

Mar. 30, 2012 (GB) .................................. 1205673.5

(51) Int. Cl.
| | |
|---|---|
| *B01J 3/06* | (2006.01) |
| *B24D 18/00* | (2006.01) |
| *B22F 7/08* | (2006.01) |
| *C22C 26/00* | (2006.01) |
| *C04B 35/52* | (2006.01) |
| *C04B 35/5831* | (2006.01) |
| *C04B 35/645* | (2006.01) |
| *B23B 27/14* | (2006.01) |
| *E21B 10/56* | (2006.01) |
| *C01B 32/25* | (2017.01) |
| *B24D 3/00* | (2006.01) |
| *B22F 5/00* | (2006.01) |

(52) U.S. Cl.
CPC .................. *B01J 3/06* (2013.01); *B22F 7/08* (2013.01); *B23B 27/148* (2013.01); *B24D 18/00* (2013.01); *C01B 32/25* (2017.08); *C04B 35/52* (2013.01); *C04B 35/5831* (2013.01); *C04B 35/645* (2013.01); *C22C 26/00* (2013.01); *E21B 10/56* (2013.01); *B22F 2005/001* (2013.01);
(Continued)

(58) Field of Classification Search
CPC .. B01J 3/06; E21B 10/00; E21B 10/46; E21B 10/54; E21B 10/55; E21B 10/567; E21B 10/56; B24D 3/00; B24D 18/00; B23B 2226/31; B23B 2226/315; B23B 27/00; B23B 27/14; B23B 27/20; C23C 16/00; C23C 16/27
See application file for complete search history.

(56) References Cited

U.S. PATENT DOCUMENTS

| | | |
|---|---|---|
| 4,403,015 A | 9/1983 | Nakai et al. |
| 4,643,741 A | 2/1987 | Yu et al. |

(Continued)

FOREIGN PATENT DOCUMENTS

| | | |
|---|---|---|
| EP | 0133386 A2 | 2/1985 |
| EP | 0425812 A2 | 5/1991 |

(Continued)

OTHER PUBLICATIONS

International Search Report for PCT/EP13/056550 dated Jun. 18, 2013.

(Continued)

*Primary Examiner* — Jennifer A Smith
*Assistant Examiner* — Alexandra Marie Moore
(74) *Attorney, Agent, or Firm* — Bryan Cave Leighton PaisnerLLP

(57) ABSTRACT

A method of making a body of polycrystalline superhard material comprising placing an aggregated mass of grains of superhard material into a canister, placing a ceramic layer either in direct contact with the aggregated mass of grains of superhard material or in indirect contact therewith, the ceramic layer being spaced from the grains by an interlayer of material when present, the ceramic layer having a surface with surface topology, the surface topology imprinting a pattern in the aggregated mass of grains of superhard material complementary to the surface topology, the ceramic material and the material of the interlayer being such that they do not react chemically with the superhard material and/or a sinter catalyst material for the grains of superhard material. The aggregated mass of grains of superhard material and ceramic layer are subjected to a pressure of greater than 5.5 GPa and sintered to form a body of polycrystalline superhard material having a surface topology complementary to the surface topology of the ceramic layer. The ceramic layer and interlayer if present are then removed from the body of polycrystalline material. There is also disclosed a body of polycrystalline superhard material having a surface topology on a first surface, the first surface being substantially free of material from a canister used in formation of the body of polycrystalline superhard material.

10 Claims, 1 Drawing Sheet

(52) U.S. Cl.
CPC ..... *B22F 2005/005* (2013.01); *B22F 2998/10* (2013.01); *B23B 2200/32* (2013.01); *B23B 2226/315* (2013.01); *B24D 3/00* (2013.01); *C04B 2235/427* (2013.01); *Y10T 407/24* (2015.01)

(56) References Cited

U.S. PATENT DOCUMENTS

| | | | |
|---|---|---|---|
| 5,037,451 A | * | 8/1991 | Burnand ............ B24D 18/0009 51/293 |
| 5,453,105 A | | 9/1995 | Middlemiss et al. |
| 5,979,579 A | * | 11/1999 | Jurewicz ............. E21B 10/5673 175/428 |
| 6,106,585 A | | 8/2000 | Packer et al. |
| 6,179,886 B1 | | 1/2001 | Gordeev et al. |
| 6,447,852 B1 | | 9/2002 | Gordeev et al. |
| 6,709,747 B1 | | 3/2004 | Gordeev et al. |
| 6,919,040 B2 | | 7/2005 | Fries et al. |
| 7,008,672 B2 | | 3/2006 | Gordeev et al. |
| 2004/0111159 A1 | | 6/2004 | Pope et al. |
| 2011/0031033 A1 | * | 2/2011 | Mourik ................. C22C 26/00 175/428 |

FOREIGN PATENT DOCUMENTS

| | | | | |
|---|---|---|---|---|
| EP | 0895974 A1 | | 10/1999 | |
| GB | 1000702 A | * | 8/1965 | ............. B01J 3/062 |
| WO | 00/48789 | | 8/2000 | |
| WO | 2009/013713 A2 | | 1/2009 | |
| WO | 2013/011025 A2 | | 1/2013 | |
| WO | 2013/038000 A1 | | 3/2013 | |
| WO | 2013/040125 A2 | | 3/2013 | |

OTHER PUBLICATIONS

Search Report for GB1205673.5 dated Jul. 20, 2012.
Search Report for GB1305586.8 dated Sep. 27, 2013.

* cited by examiner

POLYCRYSTALLINE SUPERHARD MATERIAL AND METHOD FOR MAKING SAME

FIELD

This disclosure relates generally to bodies of polycrystalline super-hard material that may be used, for example, as cutters for drilling in the oil and gas industry or as inserts for machine tools, and to a method for making the same.

BACKGROUND

It has been appreciated that cutters and machine tool cutting inserts having cutting surfaces with shaped topologies may be advantageous in various applications as the surface features may be beneficial in use to divert, for example, chips from the working surface being worked on by the cutter or machine tool, and/or in some instances to act as a chip breaker. Also, such surface topologies may produce demonstrably better surface finish qualities compared to flat surface cutting tool geometries. However, the extreme hardness and abrasion resistance of materials such as PCD or PCBN which are typically used as the cutting element or insert in such applications makes it very difficult and expensive to machine these materials with desired surface topology features that may be used, for example, as chip breakers or to divert the debris generated in use.

U.S. Pat. No. 6,106,585 discloses a method for making a cutting element, including forming a composite mass by placing a mass of abrasive crystals, either diamond or CBN, and a mass of catalyst metal in contact with the abrasive crystals into a cell or can which is a protective shield metal enclosure, in which the top surface of the inside of the can is pre-formed with dimples. This dimpled surface provides a pattern for forming features on the top surface of the layer, which function as chip breaker features.

There is a need to provide super-hard bodies of polycrystalline material such as inserts for cutting or machine tools having effective performance and to provide a more efficient method for making bodies of polycrystalline materials for use as such cutters or inserts.

SUMMARY

Viewed from a first aspect there is provided a method of making a body of polycrystalline superhard material comprising:
  placing an aggregated mass of grains of superhard material into a canister,
  placing a ceramic layer formed of a ceramic material either in direct contact with the aggregated mass of grains of superhard material, or in indirect contact therewith wherein the ceramic layer is spaced from the grains by an interlayer of material, the ceramic layer having a surface with surface topology, the surface topology imprinting a pattern in the aggregated mass of grains of superhard material complementary to the surface topology, the ceramic material and the material of the interlayer where present being such that they do not react chemically with the superhard material and/or a sinter catalyst material for the grains of superhard material; the method further comprising:
  subjecting the aggregated mass of grains of superhard material and ceramic layer to a pressure of greater than around 5.5 GPa in the presence of the sinter catalyst material for the grains of superhard material at a temperature sufficiently high for the catalyst material to melt;
  sintering the grains to form a body of polycrystalline superhard material having a surface topology complementary to the surface topology of the ceramic layer; and
  removing the ceramic layer and said interlayer if present from the body of polycrystalline material.

As mentioned above, the ceramic material may be in direct contact with the grains of diamond material or may be separated therefrom by a further layer of material which acts to assist in removing the ceramic material from the polycrystalline material after sintering.

The interlayer may comprise a coating on the ceramic layer.

In embodiments where the body of polycrystalline superhard material is used as a cutter, for example for drilling in the oil and gas industry, the surface topology may be used to direct or divert the rock or earth away from the drill bit to which the cutter is attached. Alternatively or additionally, the surface topology may act as a chip breaker suitable for controlling aspects of the size and shape of chips formed when the body of polycrystalline superhard material is used, for example, as a cutter or as an insert for a machine tool to machine a workpiece. Such topology may include depression and/or protrusion features, such as radial or peripheral ridges and troughs, formed on a rake surface of the insert.

Various example arrangements and combinations for cutter structures and inserts are envisaged by the disclosure. The cutter structure may comprise natural or synthetic diamond material, or cBN material. Examples of diamond material include polycrystalline diamond (PCD) material, thermally stable PCD material, crystalline diamond material, diamond material made by means of a chemical vapour deposition (CVD) method or silicon carbide bonded diamond. An example of cBN material is polycrystalline cubic boron nitride (PCBN).

Viewed from a further aspect there is provided a body of polycrystalline superhard material having a surface topology on a first surface, the first surface being substantially free of material from a canister used in formation of the body of polycrystalline superhard material.

Disclosed example methods may be relatively less complex and or more cost efficient, and disclosed example inserts and cutter structures may have enhanced machining or cutting performance.

BRIEF DESCRIPTION OF THE DRAWINGS

Embodiments are now described with reference to the accompanying drawings in which.

The same reference numerals have been used throughout the drawings to refer to common features.

DETAILED DESCRIPTION

Figure 1:
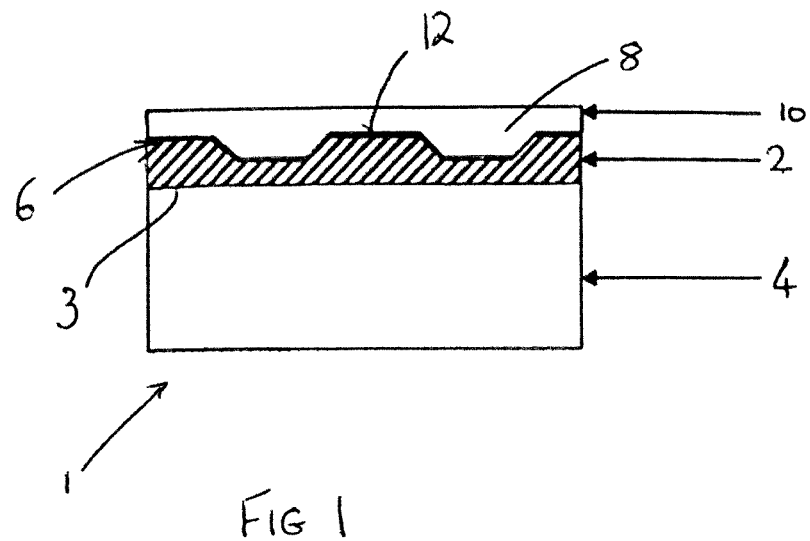
FIG. 1 is a schematic cross-section through a first cutter structure having a planar interface between the body of polycrystalline superhard material and a substrate attached thereto.
Figure 2:
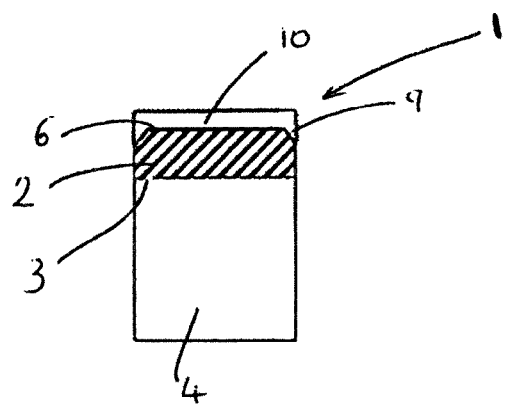
FIG. 2 is a schematic cross-section through a second cutter structure in which the surface topology created is in the form of a chamfer around a surface of the body of polycrystalline superhard material.

FIGS. 1 and 2 show cutter structures which may, in use, be attached to a drill bit (not shown) for oil and gas drilling operations. The cutter structures 1 comprise a PCD or PCBN layer 2 bonded along an interface 3 to a substrate 4, such as a tungsten carbide substrate. In FIG. 1, the PCD or PCBN layer 2 has a free surface 6 having a non-flat surface topology 8. The cutter structure shown in FIG. 2 differs from that shown in FIG. 1 in that the surface topology is such that a chamfer 9 is formed around a peripheral edge of the PCD layer at the free surface thereof.

A ceramic punch 10 is shown in FIGS. 1 and 2 as pressing on the free surface of the PCD or PCBN layer 2, the punch 10 having a corresponding surface topology 12 to that of the free surface of the PCD or PCBN layer 2.

Certain terms and concepts as used herein will now be briefly explained.

As used herein, "superhard" or ultra-hard material has Vickers hardness of at least about 25 GPa. Synthetic and natural diamond, polycrystalline diamond (PCD), cubic boron nitride (cBN) and polycrystalline cBN (PCBN) material are examples of superhard materials. Synthetic diamond, which is also called man-made diamond, is diamond material that has been manufactured. A PCD structure comprises or consists essentially of PCD material and a PCBN structure comprises or consists essentially of PCBN material. Other examples of superhard materials include certain composite materials comprising diamond or cBN grains held together by a matrix comprising ceramic material, such as silicon carbide (SiC), or by cemented carbide material such as Co-bonded WC material (for example, as described in U.S. Pat. Nos. 5,453,105 or 6,919,040). For example, certain SiC-bonded diamond materials may comprise at least about 30 volume percent diamond grains dispersed in a SiC matrix (which may contain a minor amount of Si in a form other than SiC). Examples of SiC-bonded diamond materials are described in U.S. Pat. Nos. 7,008,672; 6,709,747; 6,179,886; 6,447,852; and International Application publication number WO2009/013713).

As used herein, polycrystalline diamond (PCD) material comprises a mass (an aggregation of a plurality) of diamond grains, a substantial portion of which are directly inter-bonded with each other and in which the content of diamond is at least about 80 volume percent of the material. Interstices between the diamond grains may be at least partly filled with a binder material comprising a catalyst material for synthetic diamond, or they may be substantially empty. Catalyst material for synthetic diamond is capable of promoting the growth of synthetic diamond grains and or the direct inter-growth of synthetic or natural diamond grains at a temperature and pressure at which synthetic or natural diamond is thermodynamically more stable than graphite. Examples of catalyst materials for diamond are Fe, Ni, Co and Mn, and certain alloys including these. Bodies comprising PCD material may comprise at least a region from which catalyst material has been removed from the interstices, leaving interstitial voids between the diamond grains.

PCBN material comprises grains of cubic boron nitride (cBN) dispersed within a matrix comprising metal or ceramic material. For example, PCBN material may comprise at least about 35 volume percent or at least about 50 volume percent cBN grains dispersed in a matrix material comprising a Ti-containing compound, such as titanium carbide, titanium nitride, titanium carbonitride and/or an Al-containing compound, such as aluminium nitride, and/or compounds containing metal such as Co and/or W. Some versions (or "grades") of PCBN material may comprise at least about 80 volume percent or even at least about 90 volume percent cBN grains.

Thermally stable PCD material comprises at least a part or volume of which exhibits no substantial structural degradation or deterioration of hardness or abrasion resistance after exposure to a temperature above about 400 degrees centigrade, or even above about 700 degrees centigrade. For example, PCD material containing less than about 2 weight percent of catalyst metal for diamond such as Co, Fe, Ni, Mn in catalytically active form (e.g. in elemental form) may be thermally stable. PCD material that is substantially free of catalyst material in catalytically active form is an example of thermally stable PCD. PCD material in which the interstices are substantially voids or at least partly filled with ceramic material such as SiC or salt material such as carbonate compounds may be thermally stable, for example. PCD structures having at least a significant region from which catalyst material for diamond has been depleted, or in which catalyst material is in a form that is relatively less active as a catalyst, may be described as thermally stable PCD.

As explained above, PCD material and PCBN material may be provided by sintering a plurality of diamond or cBN grains respectively in the presence of a suitable binder or catalyst material onto a substrate, such as a cemented carbide substrate. The PCD or PCBN structure thus produced is likely to be formed joined to the substrate, being an integral part of a construction comprising the PCD or PCBN structure bonded to the substrate during the process in which the respective structure formed into a sintered body.

A machine tool is a powered mechanical device, which may be used to manufacture components comprising materials such as metal, composite materials, wood or polymers by machining, which is the selective removal of material from a body, called a workpiece. A rake face of a cutter insert is the surface or surfaces over which the chips flow when the tool is used to remove material from a body, the rake face directing the flow of newly formed chips. Chips are the pieces of a body removed from the work surface of the body by a machine tool in use. Controlling chip formation and directing chip flow are important aspects of tools for high productivity machining and or high surface finish machining of advanced alloys of aluminium, titanium and Nickel. The geometry of chip-breaker features may be selected according to various machining factors, such as the work piece material, cutting speed, cutting operation and surface finish required.

In a first embodiment, a body of polycrystalline superhard material is formed by the following method. An aggregated mass of grains of superhard material is placed into a canister, a ceramic layer formed of a ceramic material which does not react chemically with the superhard material is placed in contact with the aggregated mass of grains of superhard material, the ceramic layer having a surface with surface topology. The ceramic material may additionally or alternatively be such that it does not react chemically with the sinter catalyst material used to bond the grains of the superhard material to one another during sintering. In some embodiments, the surface topology of the ceramic material is placed in direct contact with the grains of superhard material to imprint a pattern therein complementary to the surface topology. In other embodiments, the ceramic material may be in indirect contact with the grains, being spaced therefrom by a thin layer or a coating to assist in post sintering separation of the ceramic material from the sintered superhard material. In such cases, any coating or additional layer is also formed of a material that does not react chemically with the superhard material and/or the sinter catalyst material. The aggregated mass of grains of superhard material and ceramic layer are then subjected to a pressure of greater than around 5.5 GPa in the presence of a sinter catalyst material for the grains of superhard material, at a temperature sufficiently high for the catalyst material to melt. The grains are then sintered to form a body of polycrystalline superhard material having a surface topology complementary to the surface topology of the ceramic layer. The ceramic layer is then removed from the body of polycrystalline material for example by impact.

The ceramic layer may be easily removed from the body of polycrystalline material as there is no chemical reaction with the ceramic material enabling easy separation of the two bodies. Any residual ceramic may be removed by a light sand blast, resulting in a good, semi-polished surface finish. The ceramic materials that may be used to create the surface topology in the superhard material may include, for example, the group of oxide ceramic materials that are not reduced by carbo-thermal reaction, including Magnesia, Calcia, Zirconia, Alumina.

In some embodiments, pressures of greater than around 5.5 GPa to above 7 GPa may, for example, be used to sinter the polycrystalline superhard material and sintering may take place at a temperature of, for example, between around 1300 to around 1800 degrees C.

As mentioned above, in some embodiments, the surface topology of the ceramic material may be coated with a layer which directly contacts the grains prior to sintering and which is of a composition such that it facilitates removal of the ceramic body from the sintered body of polycrystalline superhard material. Examples of such a coating may include zirconia, alumina, calcium carbonate or calcium oxide.

In alternative embodiments, the ceramic material directly contacts the grains of polycrystalline superhard material to be sintered.

Examples of superhard material may include grains of diamond material, such as an aggregated mass of natural or synthetic diamond grains or, for example, an aggregated mass of cubic boron nitride grains. The step of placing the grains of superhard material into the canister may, in some embodiments, comprise providing a plurality of sheets comprising the grains and stacking the sheets in the canister to form the aggregation of superhard grains. In other embodiments, the grains of superhard material may be deposited into the canister using sedimentation or electrophoretic deposition techniques.

In some embodiments, the ceramic material may be formed, for example, of any one or more of the group of oxide ceramic materials that are not reduced by carbo-thermal reaction in contact with the grains. An example of such materials may include any one or more of the group of oxide ceramic materials comprising oxides of magnesia, calcia, zirconia, and/or alumina.

The steps of placing the materials in the canister may be reversed or their order changed, for example, the step of placing the ceramic layer in contact with the aggregated mass of grains may be after the step of placing the grains into a canister. Alternatively, the ceramic layer may be placed into the canister before the grains are placed in the canister.

The body of polycrystalline superhard material formed by this method may have a free outer surface, on removal of the ceramic layer therefrom, which is of the same quality as the bulk of the body of polycrystalline material. This is in contrast, for example, to conventionally formed PCD in which the PCD layer in direct contact with the canister material used during sintering is usually of an inferior quality compared to the bulk PCD due to an interaction between the diamond, cobalt binder and canister material. Thus, in conventional PCD cutters, it is usually necessary to remove the top surface by grinding, sandblasting or other methods. Such steps are not required in PCD formed according to one or more embodiments as the body of polycrystalline superhard material has a surface topology on a first surface, the first surface being substantially free of material from a canister used in formation of the body of polycrystalline superhard material.

In some embodiments, such as those illustrated in FIGS. 1 and 2, the body of superhard material, such as PCD material, may be formed on a substrate, the substrate being placed into the canister prior to sintering, the body of polycrystalline superhard material bonding to the substrate during sintering along an interface therebetween. The interface may be substantially planar, such as shown in FIGS. 1 and 2, or it may be substantially non-planar.

The substrate may, for example, be formed of cemented carbide material. In some embodiments, the sintered body may have a thickness of up to around 6000 microns.

After forming the body of sintered polycrystalline material, a finishing treatment may be applied to treat the body of super-hard material to remove sinter catalyst from at least some of the interstices between the inter-bonded grains.

The surface topology of the ceramic material may be designed according to the requirements of a given application of the polycrystalline body and having regard to the intended shape of the body depending on its ultimate use. For example, in some embodiments such as that shown in FIG. 2, the surface topology of the ceramic material is constructed to impart a chamfered edge to the body of polycrystalline superhard material during sintering.

Polycrystalline bodies formed according to the above-described method may have many applications. For example, they may be used as an insert for a machine tool, in which the cutter structure comprises the body of polycrystalline superhard material according to one or more embodiments and the surface topology of the polycrystalline material in such an application may be used as a chip-breaker. In such inserts, the cutter structure which may be joined to an insert base, may have, for example, a mean thickness of at least 100 microns, and in some embodiments, a mean thickness of at most 1,000 microns.

In some embodiments, the cutter structure is joined to the insert base at an interface surface which may be being generally in conformity with the rake face.

In other embodiments, the polycrystalline bodies formed according to the above-described method may be used as a cutter for boring into the earth, or as a PCD element for a rotary shear bit for boring into the earth, or for a percussion drill bit or for a pick for mining or asphalt degradation. Alternatively, a drill bit or a component of a drill bit for boring into the earth, may comprise the body of polycrystalline superhard material according to any one or more embodiments.

Non-limiting examples are described in more detail below to illustrate the method.

Example 1

A surface topology configuration may be designed according to the requirements of a given drilling or machining application and having regard to the intended shape of a cutter structure or machine tool insert. A cobalt-cemented carbide substrate body may be provided and a ceramic plug may be provided, the ceramic plug having a surface comprising a surface topology that is complementary (i.e. inverse) to that of the desired surface topology for the cutter or machine tool insert. A pre-compact assembly may be prepared by forming a plurality of diamond grains into an aggregation against the surface of the substrate, and encapsulating the assembly within a jacket, formed for example of alumina or other ceramic material. The surface of the ceramic plug having the desired surface topology to be imparted to the diamond body on sintering is placed in contact with the diamond grains, as shown in FIGS. 1 and 2. The diamond grains may have a mean size of at least about 1 micron and at most about 20 microns and the aggregation may be sufficiently thick (i.e. comprise a sufficiently large number of diamond grains) for a PCD layer having a thickness of at least about 1 mm to be produced. The pre-compact assembly may be subjected to an ultra-high pressure of at least about 5.5 GPa and a temperature of at least about 1,250 degrees centigrade to melt the cobalt comprised in the substrate body and sinter the diamond grains to each other to form a composite compact comprising a PCD structure formed joined to the substrate. The ceramic plug may be removed from the sintered PCD material by, for example, light impact and the PCD structure may be treated in acid to remove residual cobalt within interstitial regions between the inter-grown diamond grains. Removal of a substantial amount of cobalt from the PCD structure is likely to increase substantially the thermal stability of the PCD structure and will likely reduce the risk of degradation of the PCD material. The composite compact thus formed may be further processed, depending on its intended application. For example, if it is to be used as a machine tool insert, it may be further treated by grinding to provide a machine tool insert comprising the PCD cutter structure having well-defined chip-breaker features.

Example 2

A surface topology configuration may be designed according to the requirements of a given machining application and having regard to the intended shape of a machine tool insert. A ceramic body may be provided, having a surface comprising a surface topology that is complementary (i.e. inverse) to that of the desired surface topology for the superhard material. A pre-compact assembly may be prepared by forming a plurality of cubic boron nitride (cBN) grains into an aggregation against the surface of a pre-formed substrate, and encapsulating the assembly within a jacket formed for example of a ceramic material such as alumina. The surface of the ceramic plug having the desired surface topology to be imparted to the body on sintering is placed in contact with the cubic boron nitride (cBN) grains, as shown in FIGS. 1 and 2. The aggregation may also include a blend of powders comprising 86 weight % cBN grains and a binder material comprising 70.0 weight % Al, 11.7 weight % Co and 18.3 weight % W. The cBN grains may have a mean size in the range from about 12 microns to about 17 microns and the aggregation may be sufficiently thick for a PCBN layer having a thickness of at least about 1 mm to be produced. The pre-compact assembly may be subjected to an ultra-high pressure of at least about 5 GPa and a temperature of at least about 1,300 degrees centigrade to sinter the aggregation to form a composite compact comprising a PCBN structure formed joined to the substrate. The ceramic plug may be substantially removed by light impact and the PCBN structure may be treated, by for example, sand blasting, to remove residual ceramic material, if any. The composite compact thus formed may be processed such as by grinding to provide a machine tool insert comprising a PCBN cutter structure having well-defined chip-breaker features.

In summary, some embodiments describe a PCD/PCBN compact with engineered shapes and surface features to be used in cutting tools, drilling and other applications. The method of making such compacts by engineering the pre-composite and capsule assembly components in the high pressure systems used to make them is also described. This includes the use of ceramic nesting material, such as alumina, which becomes malleable at elevated temperatures of 1500° C., but under the high pressure conditions used to produce the compacts will still maintain its shape. The superhard material bodies so produced have surface features after recovery from the HPHT sintering cycle that will require minimal machining to achieve final tolerances for use as a cutting tool.

The invention claimed is:

1. A method of making a body of polycrystalline superhard material comprising:
   placing an aggregated mass of grains of superhard material into a canister;
   placing a ceramic layer formed of a ceramic material in indirect contact with the aggregated mass of grains of superhard material, wherein the ceramic layer is spaced from the grains by an interlayer of material, the ceramic layer having a surface with surface topology, the surface topology imprinting a pattern in the aggregated mass of grains of superhard material complementary to the surface topology, the ceramic material and the material of the interlayer being such that they do not react chemically with the superhard material and/or a sinter catalyst material for the grains of superhard material; the method further comprising:
   subjecting the aggregated mass of grains of superhard material and ceramic layer to a pressure of greater than around 5.5 GPa in the presence of the sinter catalyst material for the grains of superhard material at a temperature sufficiently high for the catalyst material to melt;
   sintering the grains to form a body of polycrystalline superhard material having a surface topology complementary to the surface topology of the ceramic layer; and
   removing the ceramic layer and said interlayer from the body of polycrystalline material.

2. A method according to claim 1, wherein the step of placing the ceramic layer in contact with the grains of superhard material comprises placing the ceramic material in indirect contact therewith through the interlayer of material, the interlayer comprising a coating on the ceramic layer.

3. A method according to claim 1, wherein the step of subjecting the grains of superhard material to a pressure comprises subjecting the grains to a pressure of greater than 7 GPa.

4. A method according to claim 1, wherein the grains comprise grains of diamond material and the step of placing the ceramic material in contact with the grains comprises placing a ceramic material formed of any one or more of the group of oxide ceramic materials that are not reduced by carbo-thermal reaction in contact with the grains.

5. A method according to claim 4, wherein the ceramic material is formed of any one or more of the group of oxide ceramic materials comprising magnesia, calcia, zirconia, and/or alumina.

6. A method according to claim 1, wherein the step of forming the body of polycrystalline superhard material comprises forming a body having a free outer surface on removal of the ceramic layer therefrom in which the free outer surface is of the same quality as the bulk of the body of polycrystalline material.

7. A method according to claim 1, wherein the step of placing an aggregated mass of grains of superhard material into a canister comprises placing an aggregated mass of natural or synthetic diamond grains into the canister.

8. A method according to claim 1, wherein the step of placing an aggregated mass of grains of superhard material into a canister comprises placing an aggregated mass of cubic boron nitride grains into the canister.

9. A method as claimed in claim 1, further comprising treating the body of super-hard material to remove catalyst material from interstices between inter-bonded grains in the superhard material after sintering.

10. A method according to claim 1, further comprising constructing the surface topology of the ceramic material to impart a chamfered edge to the body of polycrystalline superhard material during sintering.

\* \* \* \* \*